(12) United States Patent
Bansal et al.

(10) Patent No.: US 12,273,261 B2
(45) Date of Patent: Apr. 8, 2025

(54) HANDLING OF LINK-STATE INFORMATION

(71) Applicant: Arista Networks, Inc., Santa Clara, CA (US)

(72) Inventors: Arpit Bansal, Bangalore (IN); Manoj Agiwal, Bangalore (IN); Vivek Ilangovan, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 106 days.

(21) Appl. No.: 18/192,572

(22) Filed: Mar. 29, 2023

(65) Prior Publication Data

US 2024/0333627 A1    Oct. 3, 2024

(51) Int. Cl.
*G06F 15/173*  (2006.01)
*H04L 45/03*  (2022.01)
*H04L 45/12*  (2022.01)

(52) U.S. Cl.
CPC ............ *H04L 45/03* (2022.05); *H04L 45/123* (2013.01)

(58) Field of Classification Search
None
See application file for complete search history.

(56) References Cited

U.S. PATENT DOCUMENTS

2007/0214275 A1*  9/2007  Mirtorabi ............... H04L 45/02
                                                                709/230

* cited by examiner

*Primary Examiner* — Benjamin M Thieu
*Assistant Examiner* — Andrew Woo
(74) *Attorney, Agent, or Firm* — Treyz Law Group, P.C.; Tianyi He

(57) ABSTRACT

A network device may receive updated link-state information from a neighboring network device. The network device may omit processing of the received link-state information by ignoring the updates or differences if they are in portions of the link-state information that do not affect the processing or change output(s) of the processing.

20 Claims, 11 Drawing Sheets

HANDLING OF LINK-STATE INFORMATION

BACKGROUND

This relates to network devices, and more particularly, to network devices that advertise and receive link-state information.

A network device can use received link-state information to perform routing protocols or other functions. The link-state information may be received in the form of link-state messages from an adjacent network device. While the content in these link-state messages from the adjacent network device can change over time, some of these changes can be inconsequential with respect to one or more of the routing protocols.

DETAILED DESCRIPTION

A network can convey network traffic (e.g., in the form of packets, frames, etc.) between host devices. To properly route and forward the network traffic, the network can include a number of network devices configured with networking data such as forwarding decision data, routing decision data, network policy information, etc.

In some illustrative arrangements, network devices may share (e.g., advertise and receive) link-state information in the form of link-state messages (e.g., link-state protocol data units, link-state packets, link-state advertisements, etc.) to facilitate the generation of routing decision data, forwarding decision data, etc. In particular, a receiving network device may use the link-state information (e.g., content in the link-state messages) to perform one or more routing protocols. Configurations in which the network device performs operations associated with the intermediate system to intermediate system (IS-IS) routing protocol such as a shortest-path-first (SPF) route determination operation based on the received link-state information are sometimes described herein as an illustrative example. If desired, the received link-state information may be used in other contexts (e.g., with other routing protocols, with other route determination algorithms or calculations, etc.).

To maintain up-to-date routing information (e.g., routes) at the network device or to perform other networking functions, it may be desirable to perform processing (e.g., SPF route determination) each time a new link-state message is received, thereby ensuring that any new link-state information contained in the newly received link-state message is incorporated. However, some received link-state messages may not contain updates to relevant link-state information to warrant the processing of the content in these newly received link-state messages. Accordingly, the network device may classify different link-state information based on their relevance to the processing being performed (e.g., based on whether the type of link-state information affects SPF route determination and its output). Based on this classification, the network device may selectively perform the processing of the content in the newly received link-state messages (e.g., process the newly received link-state message if the received link-state message contains relevant updates to link-state information and/or omit the processing of the newly received link-state message if the received link-state message contains updates to only irrelevant link-state information). In such a manner, the network device may conserve processing resources (e.g., based on the omission of unnecessary processing of some newly received link-state messages), among other advantages.

Figure 1:
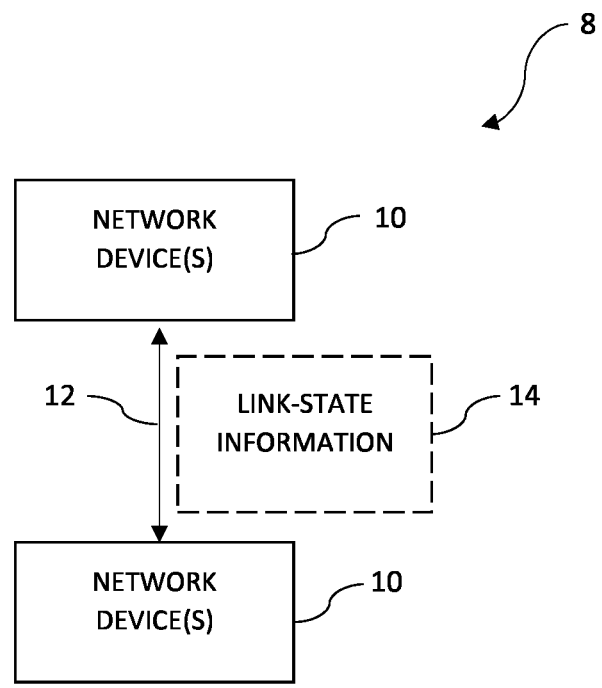
FIG. 1 is a diagram of an illustrative network having network devices that convey link-state information therebetween in accordance with some embodiments.

An illustrative networking system in which network device(s) selectively perform processing of received link-state information is shown in FIG. 1. In particular, FIG. 1 shows an illustrative network (portion) 8 which may be of any suitable scope and/or form part of a larger network of any suitable scope. As examples, network 8 may include, be, and/or form part of one or more local segments, one or more local subnets, one or more local area networks (LANs), one or more campus area networks, and/or a wide area network. Network 8 may include any suitable number of different network devices that connect corresponding host devices of network 8 to one another, thereby routing network traffic therebetween. At least some of these network devices may be connected by one or more wired technologies or standards such as Ethernet (e.g., using copper cables and/or fiber optic cables), thereby forming a wired network portion. If desired, network 8 may also include a wireless network portion coupled to the wired network portion. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

In general, network devices in network 8 can include any number of switches (e.g., multi-layer or L2/L3 switches), bridges, routers, gateways, hubs, repeaters, firewalls, wireless access points, network devices serving other networking functions, network devices that include the functionality of two or more of these devices, management devices or controllers that control the operation of one or more of these network devices, and/or other types of network devices.

As shown in the example of FIG. 1, network 8 can contain one or more (adjacent) pairs of network devices 10 (e.g., with each network device 10 forming multiple pairs with corresponding adjacent network devices 10). Configurations in which these pairs of network devices 10 are contained within an autonomous system or a routing domain are sometimes described herein as an illustrative example. However, if desired, some network devices 10 in these pairs may extend beyond the autonomous system or generally belong to another network portion.

Each pair of network devices 10 may be coupled to each other via one or more communication paths 12. Each communication path may be implemented using network paths of network 8. These network paths may include direct cable connections with or without intervening network devices. In other words, each path 12 may span across portions of network 8 (e.g., across one or more network devices therein) to provide the connectivity illustrated in FIG. 1. Two or more of these paths 12 may overlap one another or have overlapping network path portions (e.g., that pass through one or more of the same intervening network devices and/or that share one or more of the same network links).

Each pair of network devices 10 may share link-state information 14 with each other. More explicitly, a first network device 10 may advertise link-state information 14 to a second network device 10 (and any additional neighboring network devices 10) which receive the link-state information advertised by the first network device 10 and/or the second network device 10 may advertise link-state information 14 to the first network device 10 (and any additional neighboring network devices 10) which receive the link-state information advertised by the second network device 10. As described herein, link-state information 14 may refer to the payload content of link-state protocol data units or link-state packets (e.g., L1 link-state protocol data units and/or L2 link-state protocol data units), the payload content of link-state advertisements, and/or the payload content of other types of link-state messages conveyed between network devices 10. As desired, link-state information 14 may be conveyed using any suitable types of data units and/or in connection with any suitable types of protocols.

The content of link-state messages (e.g., protocol data units, packets, advertisements, etc.) or link-state information 14 may include any suitable types of information but generally may includes information indicative of the state of adjacencies or neighbors of the sending (e.g., advertising) network device 10 and corresponding metrics (e.g., cost, distance, bandwidth, etc.) of these adjacencies. Accordingly, the shared link-state information may be used by the receiving network device(s) 10 to maintain one or more link-state databases, perform a best network path (route) determination, and/or generally provide insight into network link-states (e.g., network topology), as examples. In some illustrative configurations described herein, network devices 10 may be switches (e.g., multi-layer switches), routers, controllers for the switches and routers, and/or any other suitable network nodes or devices between which link-state information is desirably conveyed.

Figure 2:
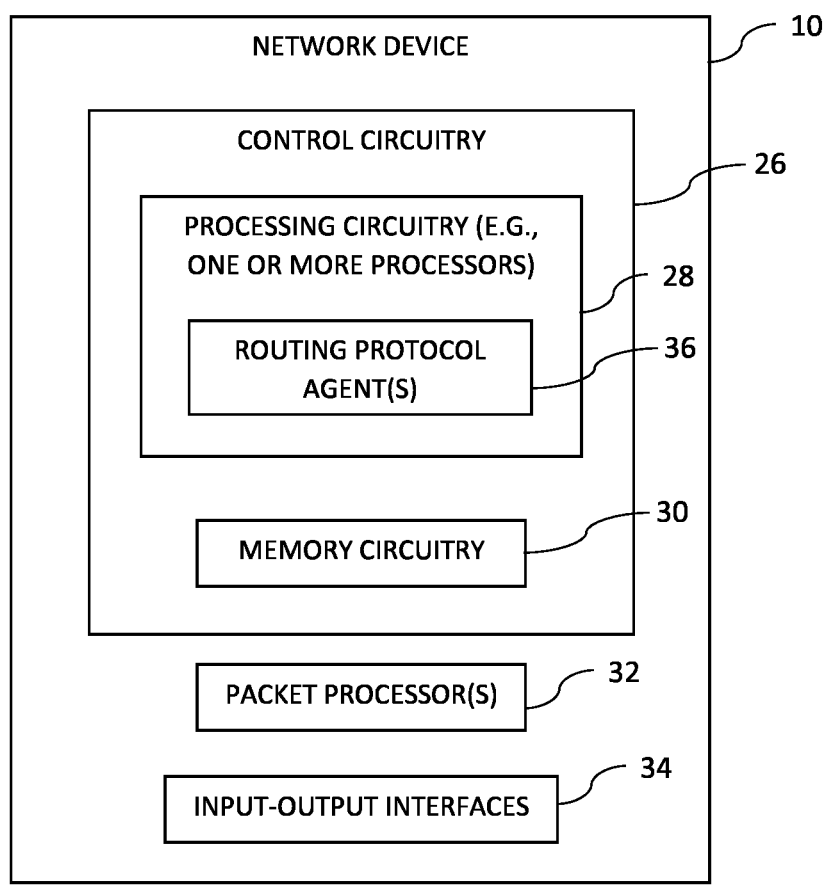
FIG. 2 is a diagram of an illustrative network device in accordance with some embodiments.

FIG. 2 is a diagram of an illustrative network device (e.g., one or more network devices 10 in FIG. 1) configured to perform routing (protocol) functions and/or other networking functions. As shown in FIG. 2, network device 10 may include control circuitry 26 having processing circuitry 28 and memory circuitry 30, one or more packet processors 32, and input-output interfaces 34 disposed within a housing of network device 10. The housing may include a base (and/or an exterior cover) that provides structural support and protection for the components of network device 10 mounted within the housing. In one illustrative arrangement, network device 10 may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10 may be a fixed-configuration network device (e.g., a fixed-configuration switch having a fixed number of ports and/or a fixed hardware configuration).

Processing circuitry 28 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 28 may run (e.g., execute) a network device operating system and/or other software/firmware that is stored on memory circuitry 30. Memory circuitry 30 may include non-transitory (tangible) computer readable storage media that stores the operating system software and/or any other software code, sometimes referred to as program instructions, software, data, instructions, or code. As an example, the network device routing (protocol) functions and/or the selective processing of link-state information described herein may be stored as (software) instructions on the non-transitory computer-readable storage media (e.g., in portion(s) of memory circuitry 30 in network device 10). The corresponding processing circuitry (e.g., one or more processors of processing circuitry 28 in network device 10) may process or execute the respective instructions to perform the corresponding routing protocol operations and/or selective link-state information processing operations. Memory circuitry 30 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 10), and/or other storage circuitry. Processing circuitry 28 and memory circuitry 30 as described above may sometimes be referred to collectively as control circuitry 26 (e.g., implementing a control plane of network device 10).

As just a few examples, processing circuitry 28 may execute network device control plane software such as operating system software, routing policy management software, routing protocol agents or processes (e.g., one or more routing protocol agents 36), routing information base agents, and other control software, may be used to support the operation of protocol clients and/or servers (e.g., to form some or all of a communications protocol stack), may be used to support the operation of packet processor(s) 32, may store packet forwarding information, may execute packet processing software, and/or may execute other software instructions that control the functions of network device 10 and the other components therein.

Packet processor(s) 32 may be used to implement a data plane or forwarding plane of network device 10. Packet processor(s) 32 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 32 may receive incoming network traffic via input-output interfaces 34, parse and analyze the received network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 30 and/or other memory circuitry integrated as part of or separate from packet processor 32.

Input-output interfaces 34 may include different types of communication interfaces such as Ethernet interfaces (e.g., one or more Ethernet ports), optical interfaces, a Bluetooth interface, a Wi-Fi interface, and/or other networking interfaces for connecting network device 10 to the Internet, a local area network, a wide area network, a mobile network, and generally other network device(s), peripheral devices, and other computing equipment (e.g., host equipment such as server equipment, user equipment, etc.). As an example, input-output interfaces 34 may include ports or sockets to which corresponding mating connectors of external components can be physically coupled and electrically connected. Ports may have different form-factors to accommodate different cables, different modules, different devices, or generally different external equipment.

In particular, as shown in FIG. 2, control plane processing circuitry 28 may execute one or more routing protocol agents 36 (sometimes referred to herein as routing protocol processes 36). As examples, processing circuitry 28 may execute one or more of an intermediate system to intermediate system (IS-IS) routing protocol agent, an open shortest path first (OSPF) routing protocol agent, a border gateway protocol (BGP) routing protocol agent or more specifically a BGP agent supporting border gateway protocol linked-state (BGP-LS), and if desired, other agents such as an OpenConfig agent. These examples are merely illustrative. In general, the embodiments described herein with respect to handling link-state information may be applicable to any other protocol agent(s) or other types of agent(s) configured to receive and handle link-state information.

Processing circuitry 28 may execute one or more of routing protocol agents 36 and any other agents by executing software instructions stored on memory circuitry 30. While different agent(s) are sometimes described herein to perform respective parts of the handling of link-state information and/or selective processing of link-state information, this is merely illustrative. Processing circuitry 28 may be organized in any suitable manner to perform each part of the handling of link-state information and/or selective processing of link-state information. Accordingly, processing circuitry 28 may sometimes be described herein to perform these operations relating to the handling of link-state information and/or the selective processing of link-state information instead of specifically referring to the one or more agents, processes, and/or kernel executed by processing circuitry 28.

Figure 3:
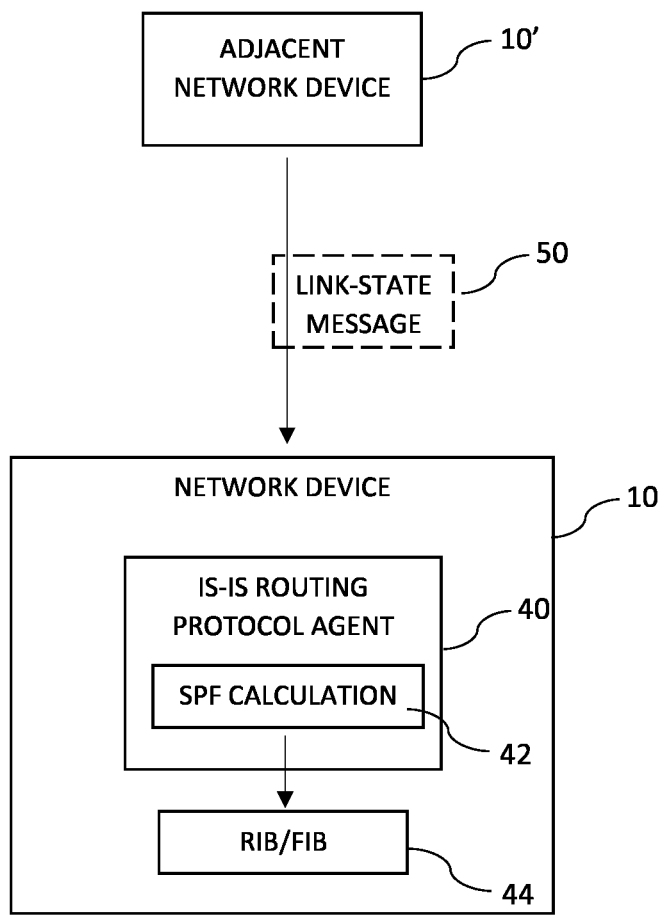
FIG. 3 is a diagram of a network device that executes an illustrative type of routing protocol agent which processes received link-state messages in accordance with some embodiments.

Configurations in which processing circuitry 28 is configured to execute at least an IS-IS routing protocol agent, thereby performing an IS-IS routing protocol, is sometimes described herein as an illustrative example. FIG. 3 is a diagram of an illustrative pair of network devices (e.g., a pair of network devices 10 in FIG. 1) in which one of the network devices (e.g., network device 10) receives link-state information in the form of link-state message 50 (e.g., a link-state protocol data unit or packet) from an adjacent or neighboring network device (e.g., network device 10'). As an example, link-state message 50 may be conveyed over a communication link (e.g., communication link 12 in FIG. 1).

Processing circuitry 28 on network device 10 may execute an IS-IS routing protocol agent 40 (e.g., based on corresponding instructions stored on memory circuitry 30). As part of the execution of IS-IS routing protocol agent 40, processing circuitry 28 may perform route determination operations to generate best network paths for routing network traffic. These optimal routes may be stored as routing and/or forwarding decision data in corresponding information bases 44 on memory circuitry 30 (e.g., one or more routing information bases containing these routes and/or one or more forwarding information bases generated based on these routes).

In the example of FIG. 3, IS-IS routing protocol agent 40 may employ a shortest path first (SPF) calculation or algorithm 42 (sometimes referred to as Dijkstra's algorithm) to perform these route determination operation(s). In other illustrative arrangements (e.g., when processing circuitry 28 executes other types of routing protocol agents instead of or in addition to IS-IS routing protocol agent 40), other types of route determination calculations may be employed. As an example, in scenarios in which processing circuitry 28 executes agent(s) for constraint-based routing protocols, a constrained shortest path first (CSPF) calculation or algorithm may be employed as part of these other agents. In general, any suitable types of agents (e.g., employing corresponding route determination operations) may make use of link-state information in link-state message 50 to generate corresponding routes or other outputs.

Upon receipt of link-state message 50, IS-IS routing protocol agent 40 executing on processing circuitry 28 may perform a route determination operation based on performing an SPF calculation 42 using the link-state information in received link-state message 50. The output (route) of the route determination operation may be stored in a routing information base (RIB) and/or may be subsequently installed into a forwarding information base (FIB). In such a manner, any updates or changes to the link-state of network device 10' as advertised in link-state message 50 may be incorporated when determining an optimal route to be stored and/or installed.

However, network device 10' may advertise some received link-state messages that do not actually affect the route determination operation at device 10. As examples, a link-state message from device 10' may not affect the route determination operation if the link-state information contained therein is the same as a previously sent link-state message or if any differences (with respect to the previously sent link-state message) are in parts of the link-state information that do not affect the route determination operation (e.g., are not used as inputs to SPF calculation 42). The frequent arrival of these irrelevant link-state messages (e.g., messages reflective of no new relevant link-state information) may prompt unnecessary executions of the SPF calculations and/or other operations of routing protocol agent 40, thereby wasting computing resources and undesirably triggering SPF backoff timers.

To mitigate these issues, it may be desirable for network device 10 to classify different parts of link-state information based on their relevance to the route determination operation (e.g., to the SPF calculation) and/or to other processing operations that make use of the link-state information.

Figure 4:
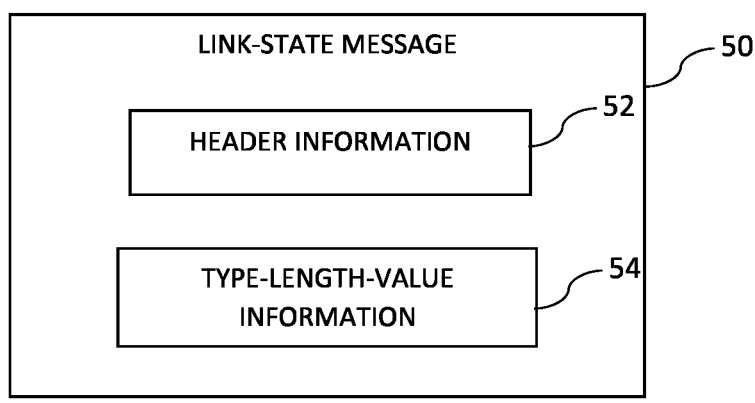
FIG. 4 is a diagram of an illustrative link-state message in accordance with some embodiments.

FIG. 4 illustrates the content in one or more link-state messages 50 such as a link-state protocol data unit or link-state protocol data unit (e.g., in an IS-IS routing protocol), a link-state advertisement (e.g., in OSPF routing protocol), or other forms of messages containing link-state information. Link-state message 50 (e.g., a link-state protocol data unit (PDU)) may include a header containing header information 52 such as an intradomain routing protocol discriminator, a (header) length indicator, a version/protocol ID extension, a message type (e.g., a PDU type), a flooding scope, a remaining lifetime, a checksum, one or more flags, a sequence number, and/or other suitable header information. The link-state information of message 50 may be contained in a data payload formatted by tuples or sets of type-length-value (TLV) information 54. Each tuple of TLV information 54 may sometimes be referred to herein as a TLV or a TLV tuple. Each message 50 may include any suitable number of TLVs to convey corresponding types of (link-state) information. The three-tuple of each TLV respectively identifies the type, the length, and the value of the TLV.

As just a few examples, the types of TLVs contained in TLV information 54 (e.g., link-state information) can include area address(es) (type 1) TLV, an authentication (type 10) TLV (e.g., containing a hash or other authentication information), an extended IS reachability (type 22) TLV, a protocol(s) supported (type 129) TLV, an IPV4 (Internet Protocol version 4) interface address(es) (type 132) TLV, a Traffic Engineering router ID (type 134) TLV, an extended IPv4 reachability (type 135) TLV, an IPV6 (Internet Protocol version 4) interface address(es) (type 232) TLV, an IPV6 reachability (type 236) TLV, an IS-IS router capability (type 242) TLV, among numerous other types of TLVs.

One or more TLVs may each further include one or more sub-type-length-value (sub-TLV) tuples or sub-TLVs (e.g., additional sub-TLV tuples identifying the type, the length, and the value of the sub-TLV). As just a few examples, the types of sub-TLVs contained in any TLVs of TLV information 54 can include an IPV4 interface address (type 6) sub-TLV, a maximum link bandwidth (type 9) sub-TLV, a maximum reservable link bandwidth (type 10) sub-TLV, an unreserved bandwidth (type 11) sub-TLV, among numerous other types of sub-TLVs.

As one illustrative example, a message 50 may include an extended IS reachability TLV that contains the 3-tuple identifying its type as 22, its length (e.g., including the length of any sub-TLV contained therein), and its value (e.g., an identifier for the IS neighbor and the value of the default metric). The extended IS reachability TLV may further identify sub-TLVs containing bandwidth information (e.g., a sub-TLV tuple containing maximum link bandwidth information, a sub-TLV tuple containing reservable link bandwidth information, a sub-TLV tuple containing unreserved bandwidth information for different Traffic Engineering classes, etc.) and containing interface address information (e.g., a sub-TLV tuple containing IPv4 interface address information).

Because some portions of TLV information 54 may not impact or cause changes in the output of route determination operations, updates or differences in these portions of TLV information 54 (e.g., across different link-state messages 50 sent from the same neighboring network device 10') can be ignored assuming that there are no other differences in these link-state messages 50. In other words, network device 10 can choose not to perform route determination operations based on determining that differences across link-state messages 50 (e.g., differences of a currently received link-state message 50 compared to a previously received and link-state message 50) are present in only these route-determination-irrelevant portions of TLV information 54.

Figure 5:
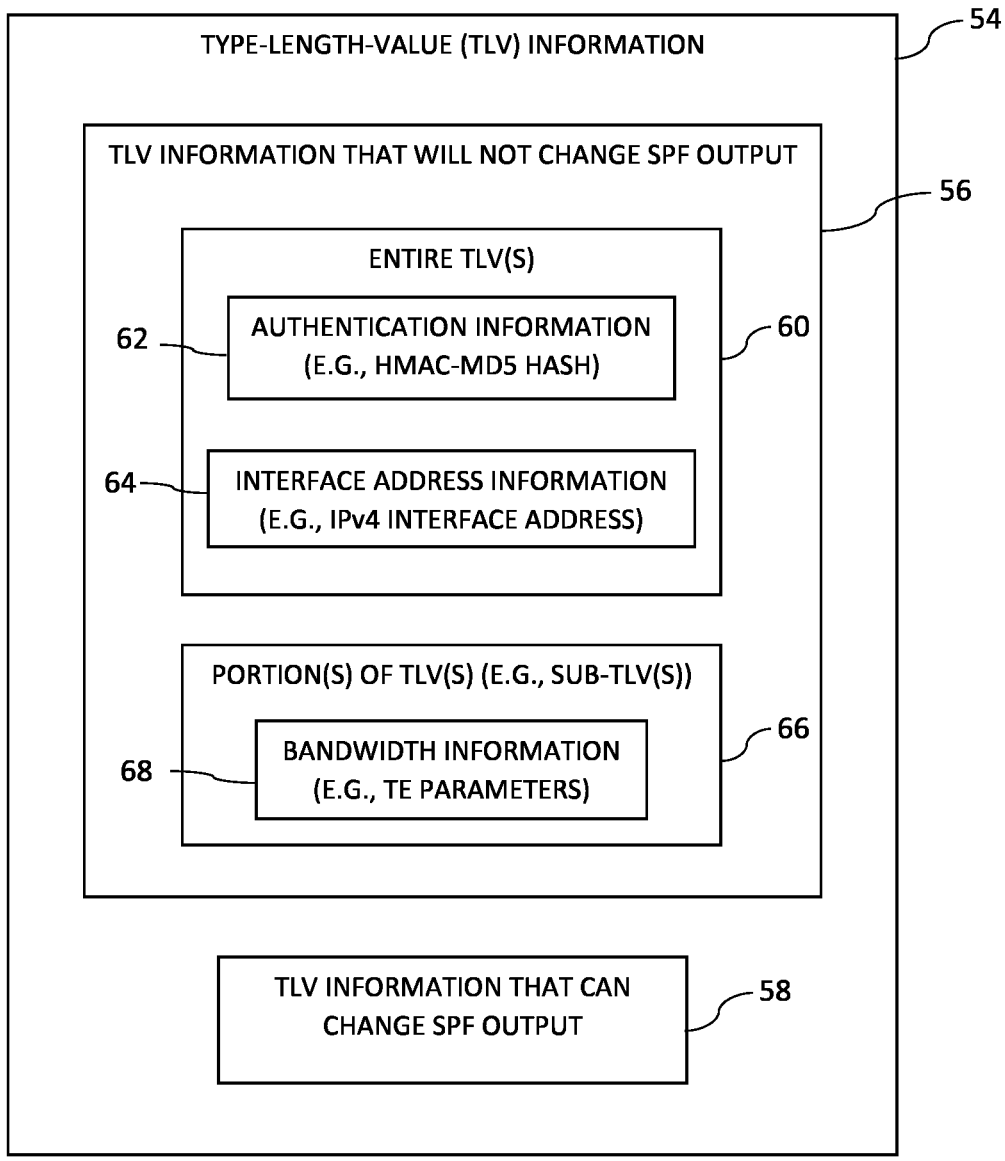
FIG. 5 is a diagram of an illustrative classification of link-state message type-length-value information in accordance with some embodiments.

FIG. 5 shows how a network device such as network device 10 may classify TLV information 54 into two groups. A first group 56 of TLV information may contain portions of TLV information 54 that do not change best path or route determination (e.g., SPF calculation) output. As an example, group 56 of TLV information can include information (e.g., the value) in one or more entire TLVs 60 such as authentication information 62 (e.g., a HMAC-MD5 hash) in an authentication TLV and/or interface address information 64 (e.g., an IPv4 interface address) in an IPV4 interface address TLV. If desired, group 56 of TLV information can also include information (e.g., the value) in one or more sub-TLVs 66 (or generally only portions of TLVs) such as bandwidth information 68 (e.g., bandwidth information as traffic engineering (TE) parameters for traffic engineering networks) and/or IP interface address information in sub-TLVs (not explicitly shown in FIG. 5).

Any TLV information 54 that does not belong in group 56 may be part of second group 58 containing portions of TLV information 54 that can change best path or route determination (e.g., SPF calculation) output. As examples, group 58 of TLV information can include information (e.g., the value) in an IS-IS router capability TLV, an area address TLV, a protocols supported TLV, an extended IS reachability TLV (excluding the bandwidth information and the IP interface address information in sub-TLVs therein that belong to group 56), an IPV6 reachability TLV, a traffic engineering router ID TLV, and/or any other suitable TLV information. If desired, some sub-TLVs may belong to group 58 instead of group 56.

Network device 10 may discriminate between the first and second groups of TLV information in any suitable manner. As an example, network device 10 first define the types of TLVs and sub-TLVs that belong in group 56 and only implicitly define the types of TLVs and sub-TLVs that belong in group 58 (e.g., defined as all other TLVs and sub-TLVs not in group 56). If desired, network device 10 may first define the types of TLVs and sub-TLVs that belong in group 58 and only implicitly define the types of TLVs and sub-TLVs that belong in group 56 (e.g., defined as all other TLVs and sub-TLVs not in group 58). If desired, each TLV and sub-TLV may be explicitly defined as being in group 56 or group 58.

In some illustrative arrangements, network device 10 (e.g., at memory circuitry 30) may store corresponding indications for one or more TLVs and/or sub-TLVs indicating whether each TLV or sub-TLV belongs in group 56 or group 58.

FIGS. 6-9 show how classification of TLV information (e.g., TLVs and sub-TLVs) into groups 56 and 58 can help device 10 selectively process link-state information (e.g., omitting unnecessary processing of link-state information).

Figure 6:
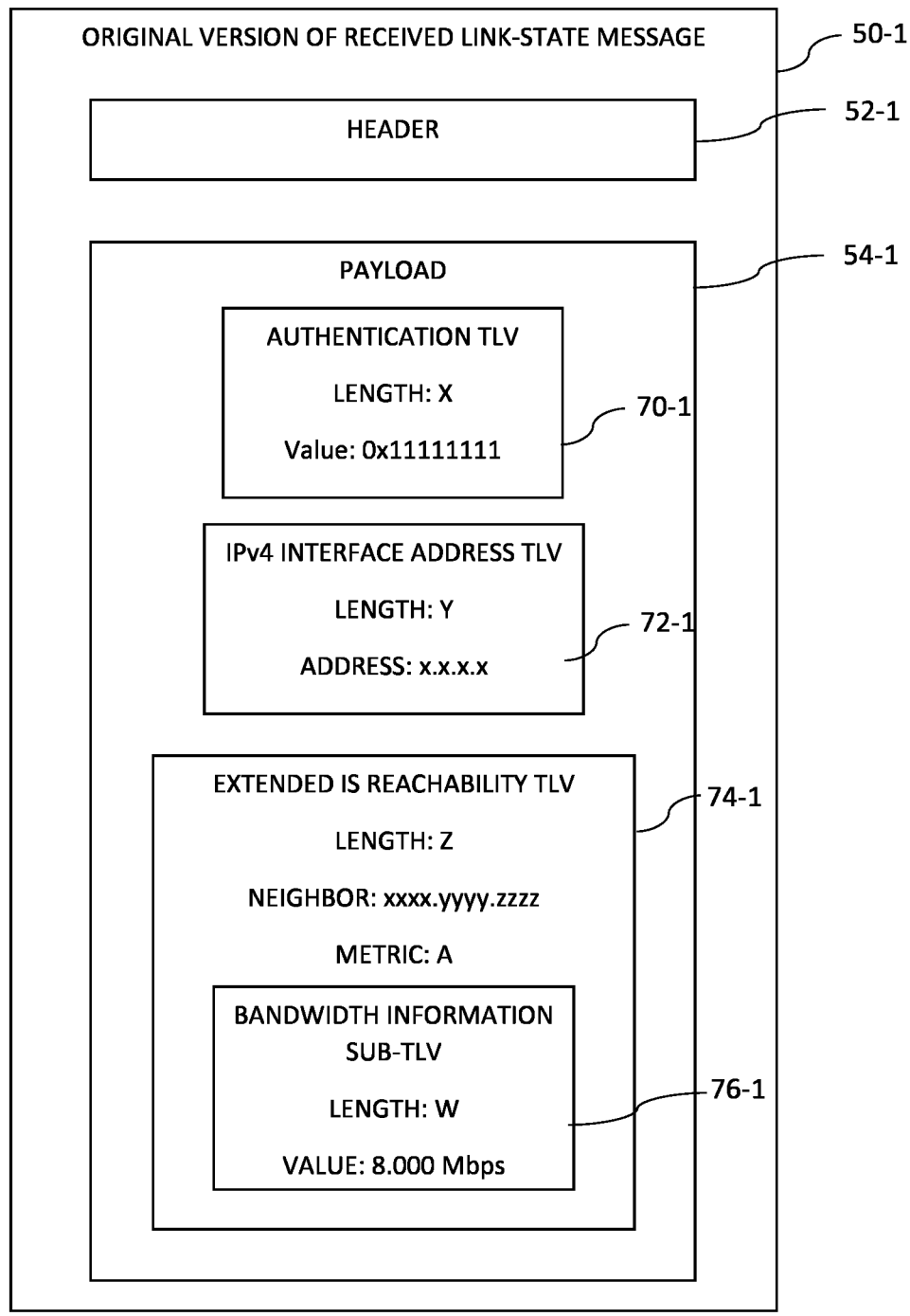
FIG. 6 is a diagram of an illustrative received link-state message in accordance with some embodiments.

FIG. 6 shows an illustrative original version of a link-state message 50-1 (e.g., message 50 as advertised by device 10' in FIG. 3) as received by network device 10. As shown in FIG. 6, message 50-1 includes header 52-1 and payload 54-1. Payload 54-1 can include numerous TLVs such as authentication TLV 70-1, IPv4 interface address TLV 72-1, extended IS reachability TLV 74-1, and other TLVs.

Authentication TLV 70-1 may include an identifier of its TLV type (e.g., type 22), a TLV length of 'X', and a TLV value of '0x11111111' (e.g., indicating a hash or other authentication information). IPv4 interface address TLV 72-1 may include an identifier of its TLV type (e.g., type 132), a TLV length of 'Y', and a TLV value of 'x.x.x.x' (e.g. indicating an IPV4 interface address). Extended IS reachability TLV 74-1 may include an identifier of its TLV type (e.g., type 22), a TLV length of 'Z', a TLV value of 'xxxx.yyyy.zzzz' (e.g., indicating an IS neighbor identifier), and a TLV value of 'A' (e.g., indicating the default metric). Additionally, extended IS reachability TLV 74-1 may also include one or more sub-TLVs such as bandwidth sub-TLV 76-1 or other types of sub-TLVs (e.g., an IPv4 interface address sub-TLV). Sub-TLV 76-1 may be a maximum link bandwidth sub-TLV, a maximum reservable link bandwidth sub-TLV, or an unreserved bandwidth sub-TLV, as examples. Sub-TLV 76-1 may include an identifier of its sub-TLV type (e.g., type 9, type 10, type 11, etc.), a sub-TLV length of 'W', a sub-TLV value of '8.000' (e.g., indicating a bandwidth of 8.000 Mbps).

In some illustrative configurations described herein as an example, network device 10 (e.g., processing circuitry 28) may have classified an authentication TLV, an IPV4 interface address TLV, and one or more bandwidth information sub-TLVs as irrelevant portions of TLV information 54 as belonging in group 56 (e.g., for the purposes of SPF calculation, route generation, routing protocol operations, and/or other types of networking operations). If desired, network device 10 may store indications of these classifications. Based on these classifications, network device 10 may ignore any differences or updates to these portions of TLV information when determining whether to perform SPF calculation, route generation, routing protocol operations, and/or other types of networking operations using the newly received link-state message.

Figure 7:
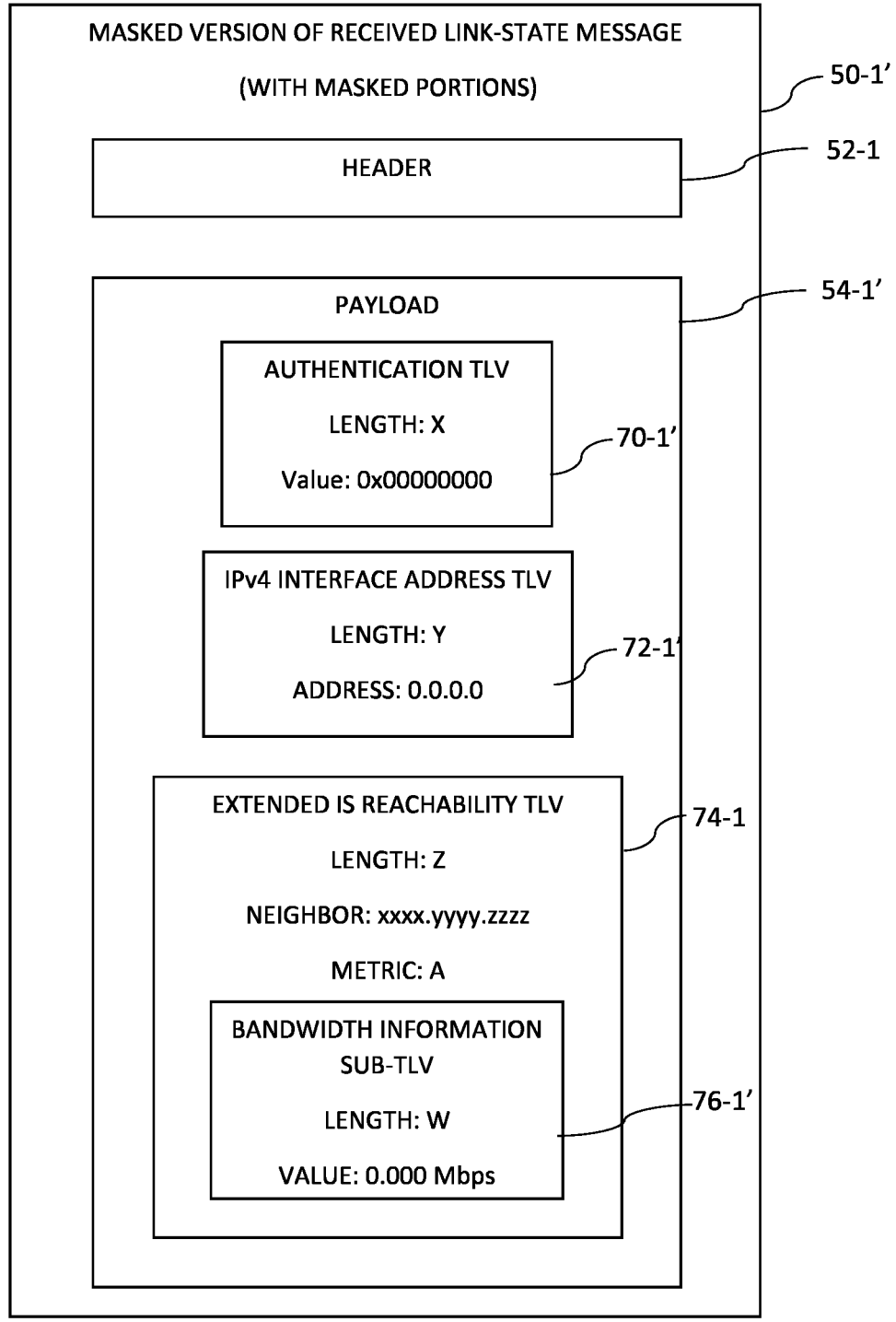
FIG. 7 is a diagram of an illustrative version of the received link-state message of FIG. 6 with masked portions in accordance with some embodiments.

In particular, network device 10 may mask or filter out these irrelevant portions of the TLV information when determining whether there are any differences between the currently received link-state message and a previously received link-state message from the same neighboring network device that would warrant processing of the currently (newly) received link-state message. FIG. 7 shows an illustrative masked version 50-1' of as-received link-state message 50-1. As shown in FIG. 7, the irrelevant portions of TLV information identified by network device 10 as being unable to change the output of route generation or more specifically the output of the SPF calculation may be masked (e.g., their values set to a preset trivial value or a wildcard value).

In the example of FIG. 7, the value of authentication TLV 70-1 may be set to '0x00000000' (from '0x11111111'), resulting in masked version 70-1' of authentication TLV 70-1. The value of IPV4 interface address TLV 72-1 may be set to '0.0.0.0' (from 'x.x.x.x'), resulting in masked version 72-1' of IPV4 interface address TLV 72-1. The value of bandwidth information sub-TLV 76-1 (e.g., a maximum link bandwidth TLV) may be set to '0.000' (from '8.000'), resulting in masked version 76-1' of bandwidth sub-TLV 76-1. Because bandwidth sub-TLV 76-1 is contained within extended IS reachability TLV 74-1 but the value(s) of TLV 74-1 (e.g., the neighbor identifier value and default metric value) do not belong to group 56 (e.g., can affect SPF calculation, route generation, routing protocol operations, and/or other types of networking operations), only the sub-TLV portion of TLV 74-1 is masked.

To determine whether or not the currently (newly) received link-state message contains any updates or differences, network device 10 may access a previously received link-state message from the same sending neighboring network device. In particular, network device 10 may maintain (e.g., store at memory circuitry 30) record(s) of the most-recently received link-state messages and/or the content therein for each neighboring network device, which can be accessed for comparison with a newly received link-state message.

Figure 8:
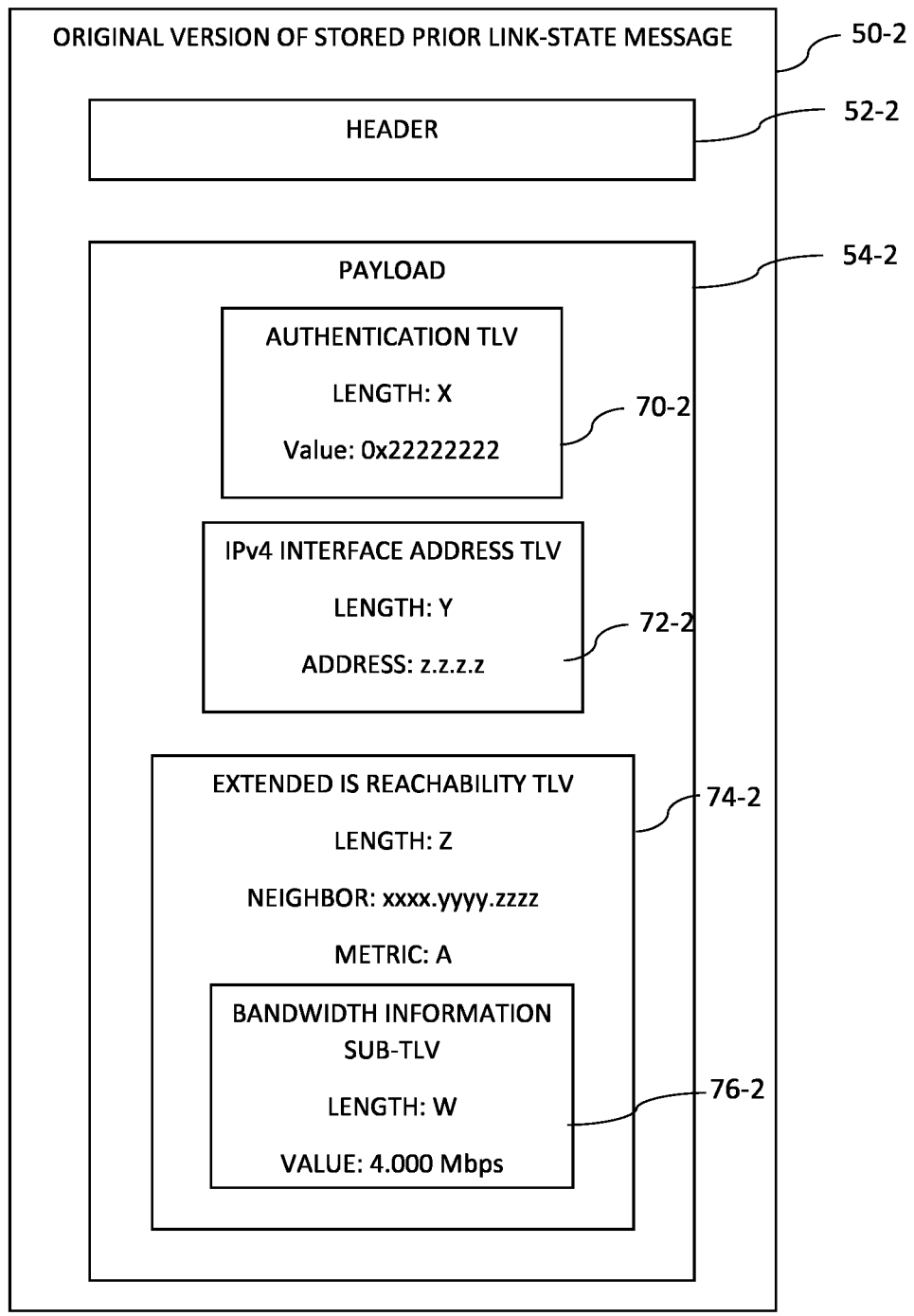
FIG. 8 is a diagram of an illustrative stored prior link-state message in accordance with some embodiments.

FIG. 8 shows an illustrative original version of a previously received link-state message 50-2 (e.g., a message received from the same sending neighboring network device 10' sequentially immediately prior to the currently received message 50-1 in FIG. 6). As shown in FIG. 8, message 50-2 includes header 52-2 and payload 54-2. Payload 54-2 can include numerous TLVs such as authentication TLV 70-2, IPv4 interface address TLV 72-2, extended IS reachability TLV 74-2, and other TLVs.

Authentication TLV 70-2 may include an identifier of its TLV type (e.g., type 22), a TLV length of 'X', and a TLV value of '0x22222222' (e.g., indicating a hash or other authentication information). IPv4 interface address TLV 72-2 may include an identifier of its TLV type (e.g., type 132), a TLV length of 'Y', and a TLV value of 'z.z.z.z' (e.g. indicating an IPV4 interface address). Extended IS reachability TLV 74-2 may include an identifier of its TLV type (e.g., type 22), a TLV length of 'Z', a TLV value of 'xxxx.yyyy.zzzz' (e.g., indicating an IS neighbor identifier), and a TLV value of 'A' (e.g., indicating the default metric). Additionally, extended IS reachability TLV 74-2 may also include one or more sub-TLVs such as bandwidth sub-TLV 76-2 or other types of sub-TLVs (e.g., an IPV4 interface address sub-TLV). Sub-TLV 76-2 may be a maximum link bandwidth sub-TLV, a maximum reservable link bandwidth sub-TLV, or an unreserved bandwidth sub-TLV, as examples. Sub-TLV 76-2 may include an identifier of its sub-TLV type (e.g., type 9, type 10, type 11, etc.) that is the same as that of sub-TLV 76-1, a sub-TLV length of 'W', a sub-TLV value of '4.000' (e.g., indicating a bandwidth of 4.000 Mbps).

Figure 9:
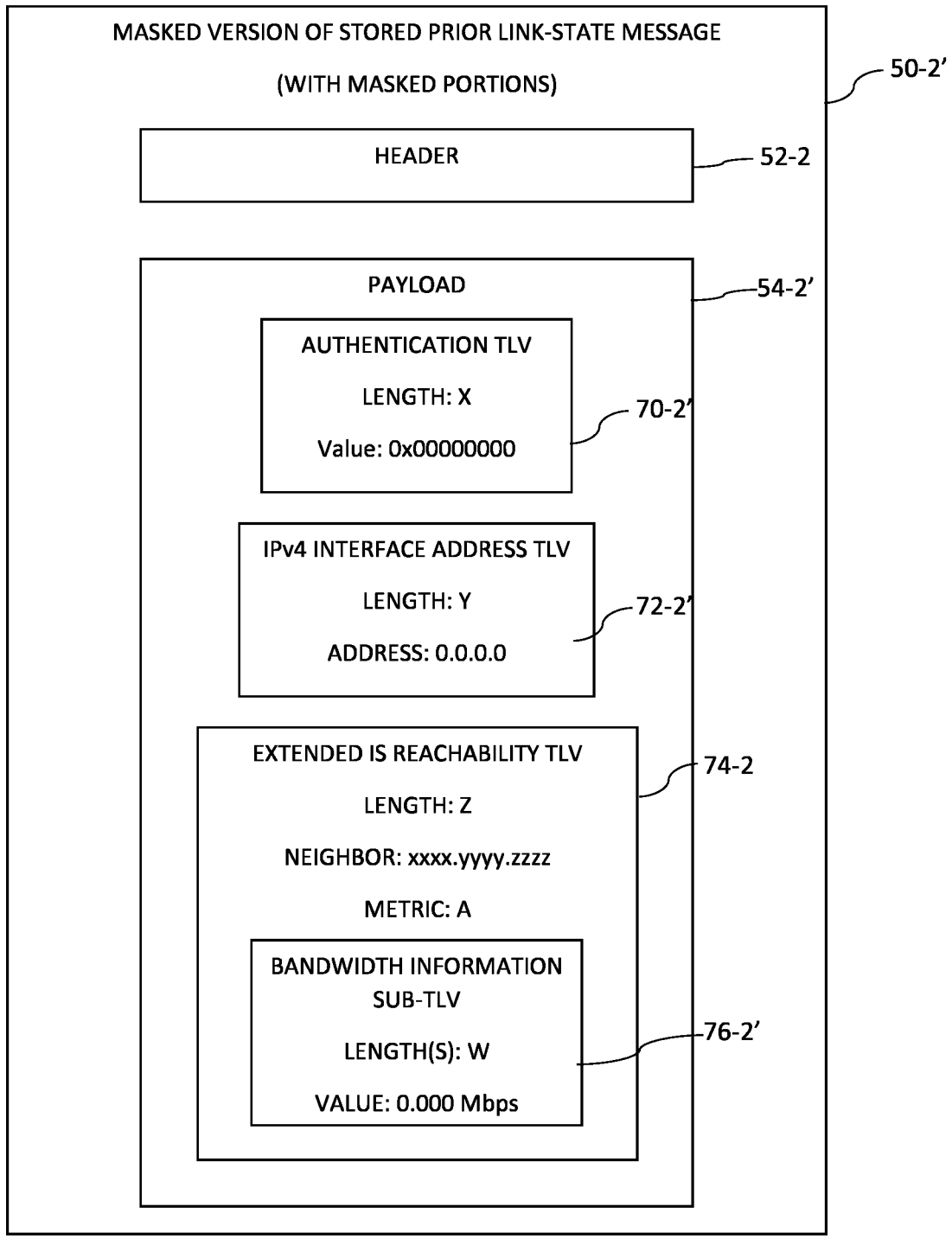
FIG. 9 is a diagram of an illustrative version of the stored prior link-state message of FIG. 8 with masked portions in accordance with some embodiments.

In a similar manner as described in connection with FIG. 7 for link-state message 50-1, network device 10 may also generate a masked version of link-state message 50-2. FIG. 9 shows an illustrative masked version 50-2' of (stored) prior link-state message 50-2. As shown in FIG. 9, the irrelevant portions of TLV information identified by network device 10 as being unable to change the output of route generation or more specifically the output of the SPF calculation may be masked (e.g., their values set to a preset trivial value or a wildcard value).

In the example of FIG. 9, the value of authentication TLV 70-2 may be set to '0x00000000' (from '0x22222222'), resulting in masked version 70-2' of authentication TLV 70-2. The value of IPV4 interface address TLV 72-2 may be set to '0.0.0.0' (from 'z.z.z.z'), resulting in masked version 72-2' of IPV4 interface address TLV 72-2. The value of bandwidth information sub-TLV 76-2 (e.g., a maximum link bandwidth TLV) may be set to '0.000' (from '4.000'), resulting in masked version 76-2' of bandwidth sub-TLV 76-2. Because bandwidth sub-TLV 76-2 is contained within extended IS reachability TLV 74-2 but the value(s) of TLV 74-2 (e.g., the neighbor identifier value and default metric value) do not belong to group 56 (e.g., can affect SPF calculation, route generation, routing protocol operations, and/or other types of networking operations), only the sub-TLV portion of TLV 74-2 is masked.

Advantageously, rather than comparing the original versions of the currently received and the previously received link-state messages (e.g., message 50-1 in FIG. 6 and message 50-2 in FIG. 8), network device 10 may compare masked versions of the currently received and previously received link-state messages (e.g., masked message 50-1' in FIG. 7 and masked message 50-2' in FIG. 9). This will ensure that the comparison will yield a match only if the remaining unmasked (or relevant) payload content of messages 50-1 and 50-2 are the same. Based on the match, network device 10 may omit processing of the link-state information in link-state message 50-1 (e.g., for a SPF calculation or generally a route generation operation, for other operations that make use of the link-state information). Doing so enables network device 10 to ignore changes or updates in irrelevant portions of the link-state information, thereby conserving computing resources that otherwise would have been spent processing the same relevant link-state information (e.g., for an unnecessary SFP calculation which could unnecessarily trigger an SFP timer thereby adversely impacting convergence time when a necessary SFP calculation is needed thereafter).

If there is no match between the un-masked link-state information of messages 50-1 and 50-2, this may be indicative of updated relevant link-state information (e.g. in one or more TLVs and/or sub-TLVs in group 58) in the newly received link-state message. Network device 10 may then process the link-state information in the newly received link-state message to ensure that the updated relevant link-state information is incorporated (e.g., into the routing protocol or other operations that use the relevant link-state information).

Using masked link-state message 50-1' (FIG. 7) and masked link-state message 50-2' (FIG. 9) as an example, network device 10 (e.g., processing circuitry 28) may compare masked versions of payload 54-1' to masked version of payload 54-1' to determine that no portions of relevant link-state information has been updated with the newly received link-state message 50-1. Accordingly, network device 10 may omit processing of the link-state information in link-state message 50-1 even though there are differences in the content (e.g., values) of certain TLVs and/or sub-TLVs between original link-state message 50-1 (FIG. 6) and original link-state message 50-2 (FIG. 8).

Network device 10 (e.g., processing circuitry 28) may perform the comparison operation between the payload content of masked link-state message 50-1' (FIG. 7) and content of masked link-state message 50-1' (FIG. 9) in any suitable manner. As examples, processing circuitry 28 may perform a bit-by-bit comparison of the two sets of raw link-state data, a portion-by-portion comparison of the two sets of partially parsed link-state data, or perform other suitable comparison operation(s).

Figure 10:
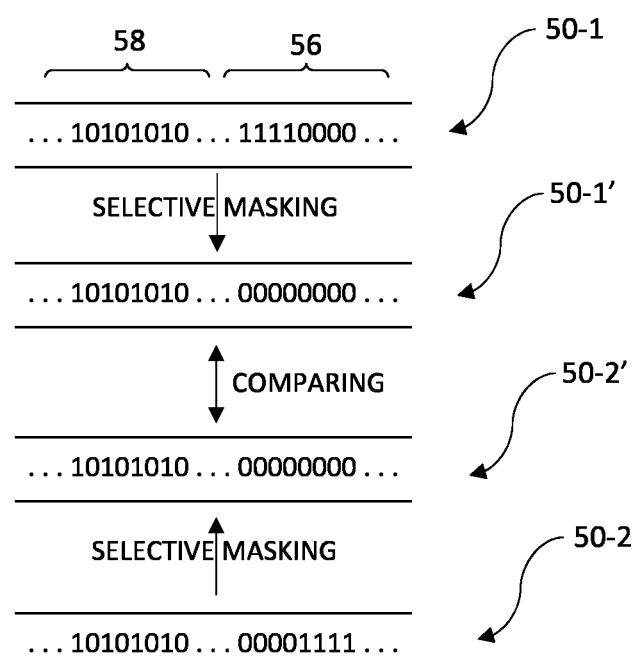
FIG. 10 is a diagram of illustrative masking and comparison operations for link-state message information in accordance with some embodiments.

FIG. 10 shows an illustrative manner in which link-state messages (e.g., link-state messages 50-1 and 50-2) may be processed and compared. In particular, while FIGS. 6-9 show link-state messages such as versions of a newly received message and versions of a stored previously received message in structured forms, this is merely illustrative. In configurations sometimes described herein as an illustrative example, each version of each link-state message 50 may be received, stored, masked, compared, and/or otherwise processed in their respective raw data forms (e.g., represented by a number of bits or bytes such as octets). Processing circuitry 28 may parse each of the original link-state messages 50-1 and 50-2 to determine boundaries of TLVs and/or sub-TLVs and/or identify portions of link-state message 50-1 and 50-2 as belonging to group 56 or group 58 (FIG. 5). Portions of TLV information belonging to group 56 may be selectively masked to generate masked link-state messages 50-1' and 50-2', which are subsequently compared.

While the examples of FIGS. 6-10 illustrate how masking, filtering, or generally modifying of original link-state messages 50-1 and 50-2 is performed prior to comparison, this is merely illustrative. If desired, to achieve a similar effect, network device 10 may disregard or ignore (e.g., by selective comparison or simply not comparing) the portions of TLV information in group 56 determined to be irrelevant (e.g., to the SFP calculation, route generation, or to other processes that use the link-state information).

While the examples of FIGS. 3 and 5-10 illustrate how best network path determination (e.g., SPF calculation) or generally route generation for an IS-IS routing protocol can be selectively performed or omitted based on comparisons of masked versions of link-state messages with certain TLV information portions masked, this is merely illustrative. If desired, comparisons of masked versions of link-state messages (or selective comparisons between relevant portions of original versions of link-state messages) may be used to selectively perform or omit other operations that make use of corresponding relevant portions of link-state information and for any suitable protocols or agents. As examples, comparisons of masked versions of link-state messages (or selective comparisons between relevant portions of original versions of link-state messages) may be used to selectively perform or omit other types of best network path determination such as CSPF calculations that use relevant portions of link-state information, operations for other routing protocols such as OSPF or BGP implementing BGP-LS that use portions of link-state information, and operations for other agents such as an OpenConfig agent implementing OpenConfig that uses portions of link-state information.

In general, the grouping of relevant and irrelevant information (e.g., the definition of groups 56 and 58 or specifically the TLVs and sub-TLVs belonging to each group) for masking or to disregard may vary depending on the application (e.g., path calculation algorithm, protocol, agent, and/or other factors). These portions may be determined in any suitable manner. As examples, network device 10 may receive user input (e.g., indicating one or more TLVs or sub-TLVs being relevant or irrelevant to a given application and therefore belonging to group 56 or group 58 for that application), may store predetermined or pre-set parameters (e.g., indicating one or more TLVs or sub-TLVs being relevant or irrelevant to a given application and therefore belonging to group 56 or group 58 for that application) on memory circuitry 30, and/or based on a (machine) learning algorithm that observes and learns which parameters do not affect operations (e.g., provides indications of one or more TLVs or sub-TLVs being relevant or irrelevant to a given application and therefore belonging to group 56 or group 58 for that application after an updatable learning time period).

Figure 11:
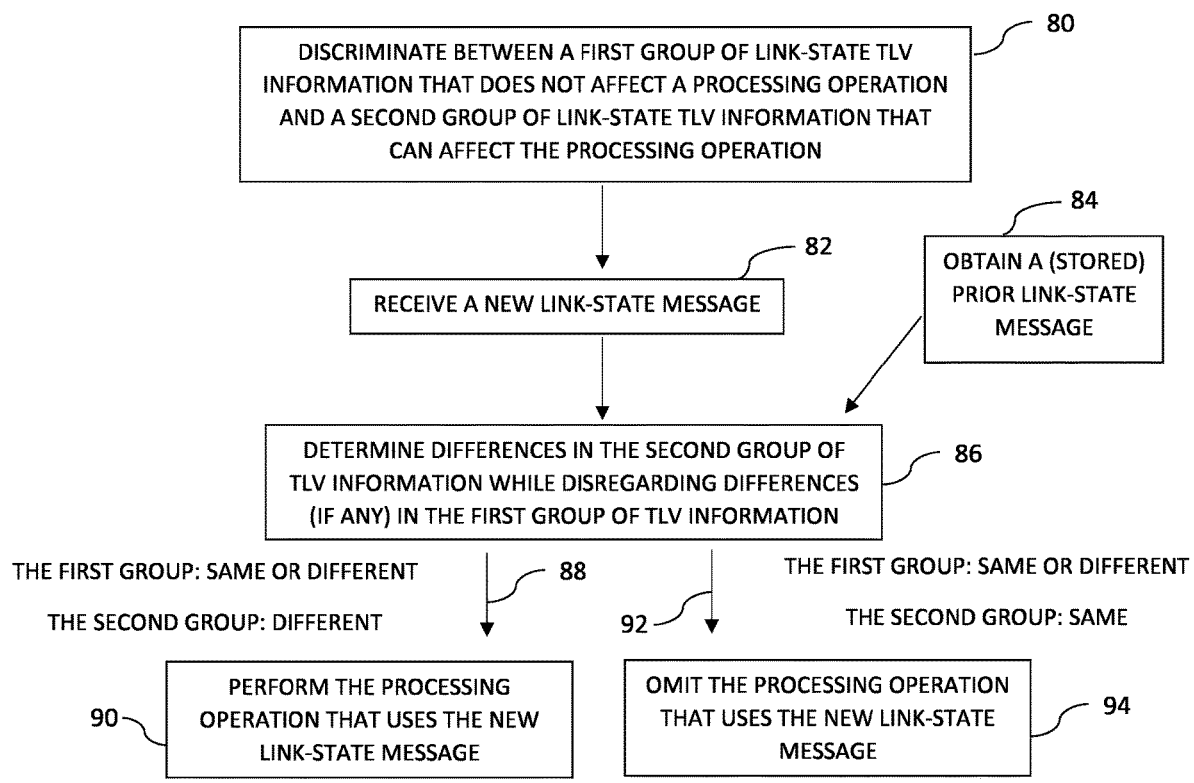
FIG. 11 is a flowchart of illustrative operations for selectively performing routing protocol operations or other operations that process a received link-state message in accordance with some embodiments.

FIG. 11 is a flowchart of illustrative operations for selectively performing routing protocol operations or other operations that process a received link-state message. These operations may be performed at one or more processors of processing circuitry 28 in network device 10. The illustrative operations described in connection with FIG. 11 may generally be performed by processing circuitry 28 in network device 10 executing software instructions stored on memory circuitry 30. If desired, one or more operations described in connection with FIG. 11 may be performed by other dedicated hardware components in device 10 or performed separately from device 10.

In illustrative configuration described herein as an example, the operations described in connection with FIG. 11 may be performed by one or more agents 36 (e.g., routing protocol or other protocol agents performing their corresponding protocols) or generally by processing circuitry 28 on which they are executed.

At block 80, processing circuitry 28 may discriminate between a first group of link-state TLV information (e.g., containing one or more TLVs or sub-TLVs) that does not affect a processing operation and a second group of link-state TLV information that can affect the processing operation. As examples, processing circuitry 28 may classify one or more TLVs and/or sub-TLVs as belonging to the first group (e.g., group 56 in FIG. 5) or the second group (e.g., group 58 in FIG. 5), based on user input, pre-stored information, and/or observations during a learning period. In particular, the first group may include TLVs and/or sub-TLVs that are irrelevant to the processing operation whereas the second group may include TLVs and/or sub-TLVs that are relevant to the processing operation. The processing operation may generally include any operations that make use of a (processing-relevant) portion of the link-state information in the second group. As examples, the processing operation include a best network path determination operation such as a shortest path first (SPF) calculation, a constrained shortest path first (CSPF) calculation, or other calculations or algorithms to determine a best network path for traffic traversal, may include other types of route generation operations, may include operations for an IS-IS routing protocol, for an OSPF routing protocol, or for a BGP routing protocol implement BGP LS, or may include operations for OpenConfig.

At block 82, processing circuitry 28 may receive or generally obtain a new link-state message (sometimes referred to herein as a currently received link-state message) from an adjacent neighboring network device.

At block 84, processing circuitry 28 may obtain a prior link-state message (sometimes referred to herein as a previously received link-state message). The prior link-state message may be obtained from link-state records or databases stored on memory circuitry 30, which can store the last-received (e.g., most up-to-date) prior link-state message from the same adjacent neighboring network device.

At block 86, processing circuitry 28 may determine differences (e.g., whether there are any differences) in the second group of TLV information between the new and prior link-state messages while disregarding or ignoring differences (if any) in the first group of TLV information between the new and prior link-state messages. As examples, the determination of differences in some portions (e.g., some TLVs and/or sub-TLVs) between the new and prior link-state messages while disregarding possible differences in other portions (e.g., other TLVs and/or sub-TLVs) between the new and prior link state messages may be achieved via masking or filtering (e.g., as described in connection with FIGS. 7, 9, and 10), may be achieved via selective comparisons of some TLVs and sub-TLVs and no comparisons of other TLVs and sub-TLVs, and/or other operations.

Regardless of any differences in the first group of (irrelevant) TLV information, if there are difference(s) in the second group of (relevant) TLV information between the new and prior link-state messages, processing may proceed via path 88 to block 90. At block 90, processing circuitry 28 may perform the processing operation that uses the changed relevant portions of the new link-state message. The changed relevant portions of the new link-state message should be incorporated into the processing operation as the output(s) of the processing operation may be changed based on the changed relevant portions of the new link-state message.

Regardless of any differences in the first group of (irrelevant) TLV information, if there are no difference(s) in the second group of (relevant) TLV information between the new and prior link-state messages, processing may proceed via path 92 to block 94. At block 94, processing circuitry 28 may omit the processing operation that would have used the unchanged relevant portions of the new link-state message.

The operations described in connection with FIG. 11 are merely illustrative. If desired, one or more of these operations may be omitted and/or changed. If desired, some operations described in connection with FIG. 11 may be performed in parallel with each other (e.g., across multiple components such as across multiple processors of network device 10) and/or some operations described in connection with FIG. 11 may be performed sequentially (e.g., at only a single component such as at a processor of network device 10).

The methods and operations described above in connection with FIGS. 1-11 may be performed by the components of one or more network devices and/or server or other host equipment using software, firmware, and/or hardware (e.g., dedicated circuitry or hardware). Software code for performing these operations may be stored on non-transitory computer readable storage media (e.g., tangible computer readable storage media) stored on one or more of the components of the network device(s) and/or server or other host equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other host equipment (e.g., processing circuitry 28 in network device 10).

The foregoing is merely illustrative and various modifications can be made to the described embodiments. The foregoing embodiments may be implemented individually or in any combination.

What is claimed is:

1. A method for handling link-state information, the method comprising:
   receiving a link-state message having a payload containing a plurality of type-length-value (TLV) tuples;
   processing the link-state message to disregard a portion of the plurality of TLV tuples; and
   performing a network path determination based on an indication that the plurality of TLV tuples excluding the portion differ from corresponding TLV tuples in a previously received link-state message.

2. The method defined in claim 1, wherein the disregarded portion comprises a value of a given TLV tuple in the plurality of TLV tuples.

3. The method defined in claim 1, wherein a given TLV tuple in the plurality of TLV tuples comprises a sub-type-length-value (sub-TLV) tuple and wherein the disregarded portion comprises the sub-TLV tuple.

4. The method defined in claim 3, wherein the sub-TLV tuple contains bandwidth information.

5. The method defined in claim 3, wherein the sub-TLV tuple contains interface address information.

6. The method defined in claim 1, wherein processing the link-state message to disregard the portion of the plurality of TLV tuples comprises:
  modifying the portion of the plurality of TLV tuples; and
  comparing the link-state message that includes the modified portion of the plurality of TLV tuples to a modified version of the previously received link-state message.

7. The method defined in claim 6, wherein modifying the portion of the plurality of TLV tuples is by masking values of the plurality of TLV tuples and wherein the modified version of the previously received link-state message includes corresponding masked values.

8. The method defined in claim 1, wherein processing the link-state message to disregard the portion of the plurality of TLV tuples comprises:
  selectively comparing another portion of the plurality of TLV tuples to the previously received link-state message without comparing the portion of the plurality of TLV tuples to the previously received link-state message.

9. The method defined in claim 1, wherein the network path determination is based on a shortest path first (SPF) calculation or a constrained shortest path first (CSPF) calculation.

10. A method for performing a link-state routing protocol at a network device, the method comprising:
  receiving, by the network device, a link-state message for the link-state routing protocol from an external network device that has a first payload which differs from a second payload of a previously received link-state message from the external network device; and
  omitting, by the network device, an execution of a network path determination operation using the link-state message.

11. The method defined in claim 10, further comprising:
  discriminating, by the network device, between a first group of link-state information that is irrelevant to the network path determination operation and a second group of link-state information that is relevant to the network path determination operation.

12. The method defined in claim 11, wherein the link-state information in the first group does not affect an output of the network path determination operation and wherein the link-state information in the second group can affect the output of the network path determination operation.

13. The method defined in claim 11, wherein omitting the execution of the network path determination operation using the link-state message is based on payload differences existing only in the first group of link-state information.

14. The method defined in claim 11, wherein the first payload and the second payload each include a plurality of type-length-value (TLV) tuples, wherein the first group contains first types of TLV tuples, and wherein the second group contains second types of TLV tuples.

15. The method defined in claim 14, wherein one or more of the plurality of TLV tuples in each of the first and second payloads each include one or more sub-type-length-value (sub-TLV) tuples, wherein the first group contains first types of sub-TLV tuples, and wherein the second group contains second types of sub-TLV tuples.

16. The method defined in claim 10, wherein the network path determination operation is based on a shortest path first (SPF) calculation or a constrained shortest path first (CSPF) calculation.

17. The method defined in claim 10, wherein the link-state routing protocol is an intermediate system to intermediate system (IS-IS) routing protocol or an open shortest path first (OSPF) routing protocol.

18. One or more non-transitory computer-readable storage media comprising computer-executable instructions that, when executed by one or more processors in a network device, cause the one or more processors to:
  obtain first payload content that contains link-state information in a new link-state message from a neighboring network device;
  obtain second payload content that contains link-state information in a prior link-state message from the neighboring network device;
  perform a comparison between a portion of the first payload content to a corresponding portion of the second payload content; and
  omit a processing operation that uses at least the portion of the first payload content based on the portion of the first payload content matching the corresponding portion of the second payload content.

19. The one or more non-transitory computer-readable storage media defined in claim 18 further comprising computer-executable instructions that, when executed by the one or more processors, cause the one or more processors to:
  obtain a classification of different types of link-state information, wherein the classification of the different types of link-state information is indicative of the compared portions of the first and second payload content.

20. The one or more non-transitory computer-readable storage media defined in claim 19, wherein the classification of the different types of link-state information comprises at least one of a classification of types of type-length-value (TLV) tuples and a classification of types of sub-type-length-value (sub-TLV) tuples.

* * * * *